United States Patent [19]

Kiyosawa et al.

[11] Patent Number: 5,269,202
[45] Date of Patent: Dec. 14, 1993

[54] CUP-TYPE HARMONIC DRIVE HAVING A SHORT, FLEXIBLE CUP MEMBER

[75] Inventors: Yoshihide Kiyosawa; Noboru Takizawa; Takahiro Oukura; Yoshito Yamamoto, all of Nagano, Japan

[73] Assignee: Harmonic Drive Systems, Inc., Kanagawa, Japan

[21] Appl. No.: 885,780

[22] Filed: May 20, 1992

[30] Foreign Application Priority Data

May 20, 1991 [JP] Japan .................. 3-035507[U]

[51] Int. Cl.$^5$ ................................ F16H 1/32
[52] U.S. Cl. ................................... 74/640
[58] Field of Search ............................ 74/640

[56] References Cited

U.S. PATENT DOCUMENTS

| 4,524,639 | 6/1985 | Carlson | 74/640 |
| 4,823,638 | 4/1989 | Ishikawa | 74/640 |
| 4,934,212 | 6/1990 | Hofmeister | 74/640 |

FOREIGN PATENT DOCUMENTS

| 217591 | 1/1985 | Fed. Rep. of Germany | 74/640 |
| 45-41172 | 12/1970 | Japan | 74/640 |
| 508617 | 5/1976 | U.S.S.R. | 74/640 |
| 620715 | 7/1978 | U.S.S.R. | 74/640 |
| 1017868 | 5/1983 | U.S.S.R. | 74/640 |
| 1634873 | 3/1991 | U.S.S.R. | 74/640 |

Primary Examiner—Leslie A. Braun
Assistant Examiner—Khoi Q. Ta
Attorney, Agent, or Firm—Burns, Doane, Swecker & Mathis

[57] ABSTRACT

A cup-type harmonic gear drive comprises a rigid circular spline, a cup-shaped flexspline disposed inside the circular spline and a wave generator means fitted inside the flexspline for flexing the flexspline into elliptic to engage it with the circular spline and for rotating the engagement portions to thereby produce relative rotation between the splines. The flexspline has a tube, a disc-shaped diaphragm connected integrally to the end of said tube to define the cup bottom, and a thick boss formed on the center of the diaphragm. The diaphragm has a root portion from the boss, a thickness of which is set at least about three times the minimum thickness of the diaphragm. The outer profile of the diaphragm is defined, when viewed along a plane including the axis of the flexspline, by a plurality of curves having a different curvature. These curves are arranged from one having a larger curvature from the root potion to the tube portion of the diaphragm. Thus, the stress distribution of the flexspline can be made smooth to the extent for practical use even where a shorter flexspline is adopted.

28 Claims, 14 Drawing Sheets

CUP-TYPE HARMONIC DRIVE HAVING A SHORT, FLEXIBLE CUP MEMBER

BACKGROUND OF THE INVENTION

1. Field of the Invention

The present invention relates to a cup-type harmonic drive having a rigid circular member, a flexible cup member and a wave generator, and more particularly to a cup-type harmonic drive having a shorter flexible cup member.

2. Description of Prior Art

A cup-type harmonic gear drive has been known as one of typical harmonic drives, which typically consists of a rigid circular spline, a cup-shaped flexspline having 2n (n being a positive integer) less teeth than the circular spline and being disposed inside the circular spline and flexed into an elliptical shape so as to engage with the circular spline at two places, and a wave generator fitted inside the flexspline for flexing it.

Rotating the input shaft of the wave generator rotates the elliptical shape of the flexspline and causes the flexspline and circular spline to rotate relative to each other in proportion to the difference in the number of their teeth. If one of the circular spline and flexspline is fixed and the other is connected with an output shaft, the output shaft will rotate at a greatly reduced speed relative to the input shaft. Because of this ability to produce a large reduction ratio with only a small number of machine elements, harmonic gear drives are widely applied in precision machines and the like.

The harmonic gear drives are disclosed, for example, in U.S. Pat. No. 2,906,143 issued to Musser on Sep. 29, 1959, U.S. Pat. No. 4,823,638 issued to Ishikawa on Apr. 25, 1989 and U.S. Pat. No. 4,974,470 issued also to Ishikawa on Dec. 4, 1990 and the like.

As illustrated in FIG. 1 wherein an embodiment of the present invention is shown, the cup-shaped flexspline 3 of the cup-type harmonic gear drive 1 consists of a tube portion 31, a disc-shaped diaphragm portion 32 connected integrally on one end of the tube portion 31 to define the cup bottom, and a thick boss portion 33 formed integrally on the center portion of the diaphragm 32. The flexspline teeth 34 are formed on the outer surface adjacent to the open end of the tube portion 31. In operation, the flexspline 3 is repeatedly flexed in the radial direction at the side of its open end by means of the wave generator 4. The tube and diaphragm portions 31, 32 serve as a kind of flexible coupling to absorb deformation of the teeth portion of the tube which is deformed into an ellipoid by the wave generator 4.

The amount of elliptical deformation of the tooth portion is generally determined in view of mechanism on the basis of the reduction ratio. Thus, in the conventional harmonic gear drives, the ratio of the pitch diameter of the tooth portion to the axial length of the flexspline is approximately 1:1. Reducing the axial length of the flexspline causes increase of the coning angle of the flexspline 3 as shown in FIG. 10. The increase in the coning angle causes the bending stress repeatedly appeared in the diaphragm 32 to increase, and also causes to reduce the engagement region between the teeth of the splines. These deteriorate the strength of the harmonic gear drive. In addition, as illustrated in FIG. 19, the misalignment of the flexspline setting will greatly deteriorate the performance of the harmonic gear drive.

Further, increase of the coning angle of the flexspline causes to shift the engagement region of the teeth between the flexspline and the circular spline. As illustrated in FIG. 11, where the coning angle $\Theta$ is sufficiently small, the teeth of the flexspline engage with those of the circular spline in the region A designated by diagonal lines. The wave bearing 43 is positioned substantially in accordance with this engagement region A. In contrast, where the coning angle is larger, the teeth of the flexspline engage only at their end side portion with those of the circular spline in the narrow extent of the engagement region A as shown in FIG. 12. Thus, the engagement region A is shifted from the position where the wave bearing 43 is disposed. In this condition, since the engagement of the teeth between the flexspline and the circular spline is no longer supported or maintained properly by the wave bearing, proper torque transfer through the engagement region cannot be expected. In the prior art, this kind of problem has not been fully recognized, and so no proposal has been made to solve the problem.

Accordingly, one object of the present invention is to provide a harmonic drive which has a cup-shaped flexible member of an improved configuration so that a compact harmonic drive having a shorter flexspline can easily be realized.

Another object of the present invention is to provide a harmonic drive in which a circular rigid member and a flexible member thereof engage properly with each other even where a shorter flexible member is adopted.

SUMMARY OF THE INVENTION

In one aspect of the present invention, there is provided a cup-type harmonic drive which comprises a circular rigid member, a cup-shaped flexible member of an improved configuration disposed inside the circular rigid member and a wave generator means fitted inside the flexible member for flexing the flexible member radially to engage or contact it with the circular rigid member partially and for rotating the engagement or contact portions to thereby produce relative rotation between the circular rigid member and the flexible member. The cup-shaped flexible member of an improved configuration has a tube portion, a disc-shaped diaphragm portion connected integrally to the end of the tube portion to define the cup bottom, and a thick boss portion formed on the center of the diaphragm portion. The diaphragm portion is formed such that a thickness of the root portion thereof from the boss portion is at least about three times as the minimum thickness of the diaphragm portion.

The diaphragm portion is preferably formed as follows: The outer profile of the diaphragm portion is defined, when viewed along a plane including the axis of the flexible member, by a plurality of curves having a different curvature. These curves are arranged from one of the larger curvature from the root portion to the tube portion of the diaphragm portion, whereby the thickness of the diaphragm is set to gradually reduce from the inner to outer sides along the radial direction.

In a preferred embodiment of the present invention, the tube portion of the flexible member has a thin portion adjacent to the diaphragm portion, the thickness of which is set slightly reduced compared to that of the adjacent tube portion when viewed along a plane including the axis of the flexible member.

The present invention is preferably applied to a cup-type harmonic gear drive which comprises a rigid circular spline, a cup-shaped flexspline disposed inside the circular spline and a wave generator means fitted inside the flexspline for flexing the flexspline radially to engage it with the circular spline partially and rotating the engaged portions to produce relative rotation between the circular spline and the flexspline. The flexspline has a tube portion, a disc-shaped diaphragm portion integrally connected to one end of the tube portion and a thick boss portion formed on the center of the diaphragm portion. The diaphragm portion is shaped according to the present invention as mentioned above. Preferably, the tube portion is provided with a thin portion adjacent to the diaphragm portion.

In a preferred embodiment of a cup-type harmonic gear drive according to the present invention, the supporting outer surface of the wave generator means for supporting the flexspline is positioned substantially in accordance with the engagement region of the teeth between the flexspline and the circular spline. More specifically, the center of the supporting surface of the wave generator is positioned so as to substantially accord with that of the engagement region of the teeth between the flexspline and the circular spline.

Generally, the center of the supporting surface of the wave generator means is positioned within the region one-half of the tooth width of the flexspline measured from the open end of the flexspline along the direction of the tooth width.

Preferably, where the coning angle of the flexspline is $\Theta$ and the pitch diameter of the teeth of the flexspline is D, the center of the supporting surface of the wave generator is positioned so that the distance L11 of the center from the open end of the flexspline is in the range of about 3 D·tan $\Theta$ to about 10 D·tan $\Theta$. More preferably, the distance L11 is equal to or less than D/10.

In another preferred embodiment of a cup-type harmonic gear drive according to the present invention, the tooth face of each of the splines is formed in line with a mapping curve which is a similarity transformation having a reduced scale of ½ applied to a movement locus of the flexspline to the circular spline in accordance with the configuration of the wave generator, the transformation being effected on a reference point where the splines are transferred from the contact condition to a disengagement from each other. Thus, the teeth of the flexspline engage with those of the circular spline in the broad extent of the engagement region. This tooth face profile is disclosed in the above-mentioned U.S. Pat. No. 4,823,638 to Ishikawa, the contents of which are incorporated herein by reference.

In addition, in order to obtain a smooth engagement between the teeth of the flexspline and the circular spline, it is preferable that each of the teeth of the flexspline is relieved to a certain extent on both sides thereof.

The foregoing and other features of the present invention will be described in detail in connection with illustrated embodiments and with reference to the accompanying drawings.

DETAILED DESCRIPTION OF THE PREFERRED EMBODIMENTS

While the present invention will be described in connection with preferred embodiments, it will be understood that this does not limit the invention to the embodiments. On the contrary, it is intended to cover all alternatives, modifications, and equivalents as may be included within the spirit and scope of the invention as defined by the attached claims.

Figure 1:
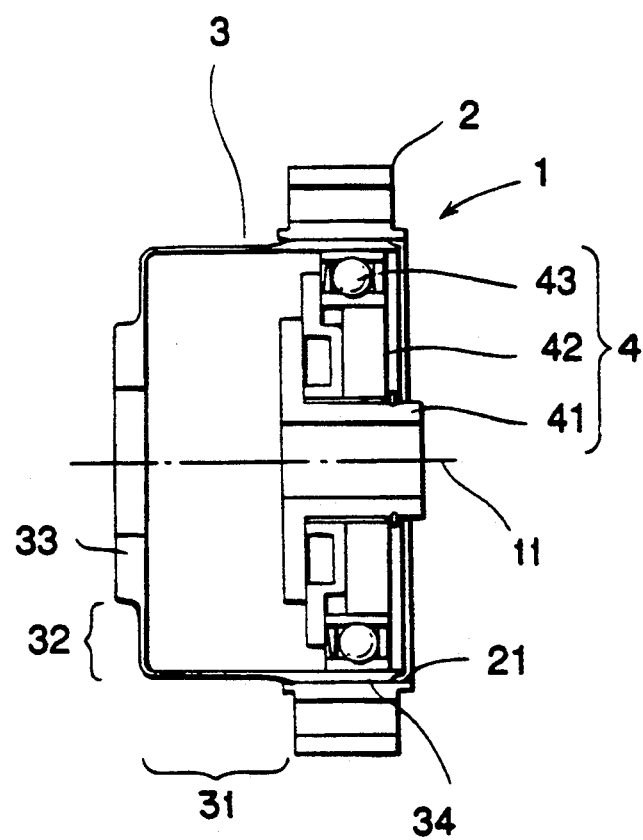
FIG. 1 is a longitudinal sectional view of a harmonic gear drive of the present invention.
Figure 2:
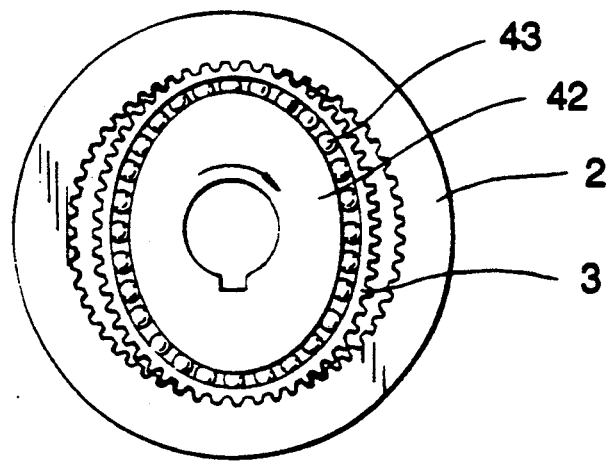
FIG. 2 is a front view of the harmonic gear drive of FIG. 1.

FIGS. 1 and 2 are sectional and side views of an embodiment of a harmonic reduction gear drive according to the present invention, respectively. The reduction gear drive 1 of the present embodiment consists basically of a rigid circular spline 2, a cup-shaped flexspline 3 disposed inside the circular spline 2 and an elliptic wave generator 4 fitted inside the flexspline 3. An axis 11 indicates the rotational center of the drive gear 1. For the purposes of this description, an axial direction is defined as parallel to the axis 11, and a radial direction is defined as perpendicular to the axis.

The tooth face of each of the splines 2 and 3 is formed in line with a mapping curve which is a similarity transformation having a reduced scale of ½ applied to a movement locus of the flexspline 3 to the circular spline 2 in accordance with the configuration of the wave generator 4, the transformation being effected on a reference point where the splines 2 and 3 are transferred from the contact condition to a disengagement from each other. Thus, the teeth of the flexspline 3 engage with those of the circular spline 2 in the broad extent of the engagement region. This tooth face profile is disclosed in the above-mentioned U.S. Pat. No. 4,823,638, the contents of which are incorporated herein by reference.

The flexspline 3 has a tube 31, a disc-shaped diaphragm 32 connected integrally to one end of the tube 31, and a thick boss 33; formed integrally on the center of the diaphragm portion 32. The tube portion 31 is formed on the outer surface at the open end with teeth 34. The teeth 34 of the flexspline 3 are engageable with teeth 21 formed on the inner surface of the circular spline 2. The wave generator 4 is comprised of an elliptic cam plate 42 having a hub 41 inserted therein and a wave bearing 43 fixed on the outer surface of the cam plate 42. The flexspline 3 is deformed elliptically at the open end side by the wave generator 4 to thereby engage the teeth thereof at two points located on the major axis of an ellipsoid with the teeth of the circular spline 2. These two engaging portions will rotate in accordance with the rotation of the wave generator 4. Since the operation of this type of harmonic reduction gear drives is well known and is disclosed, for example, in the above cited U.S. Pat. No. 4,823,638, the explanation thereof is eliminated herein.

Figure 3:
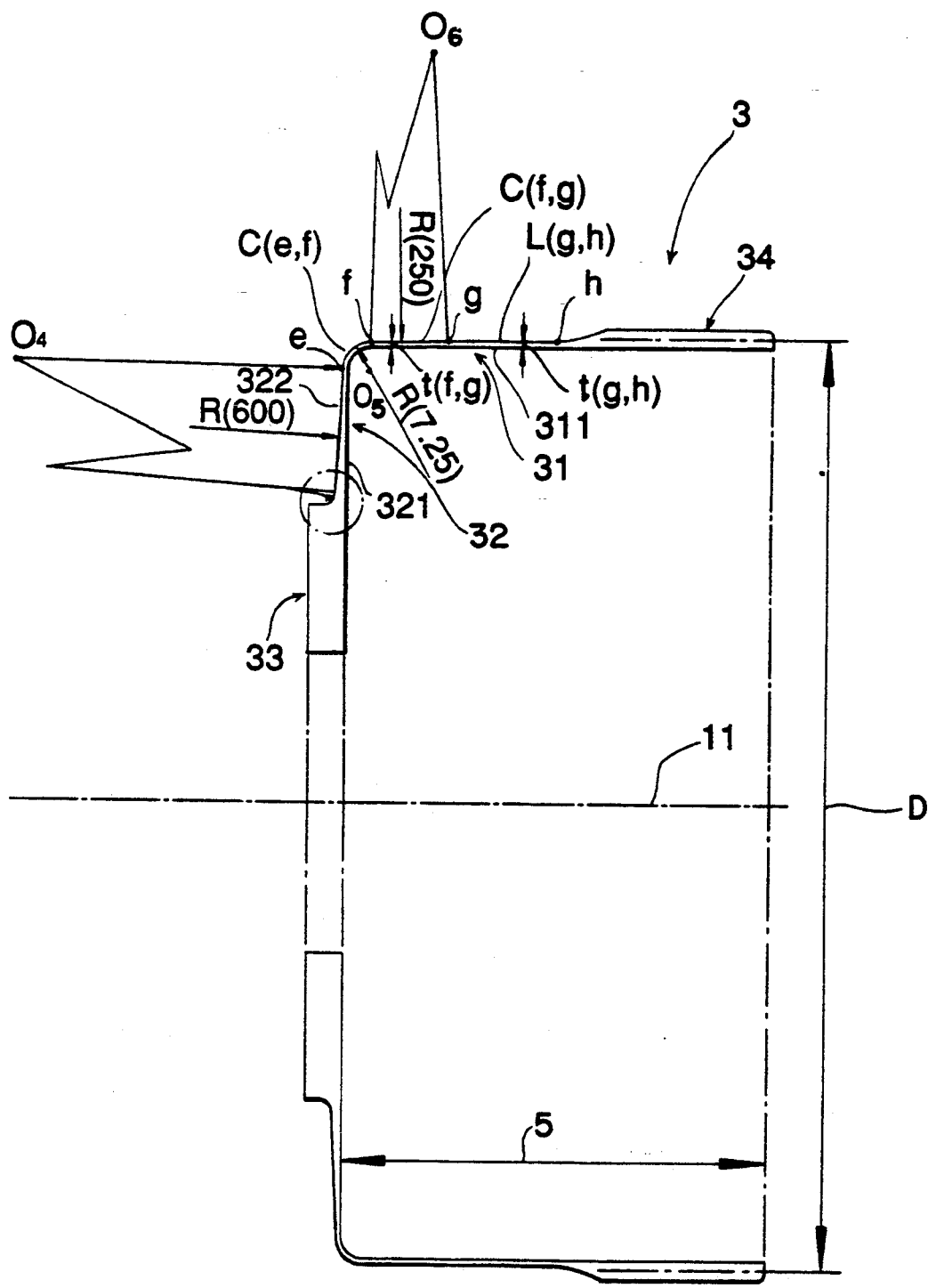
FIG. 3 is a partial longitudinal sectional view of a flexspline of the harmonic gear drive of FIG. 1.
Figure 4:
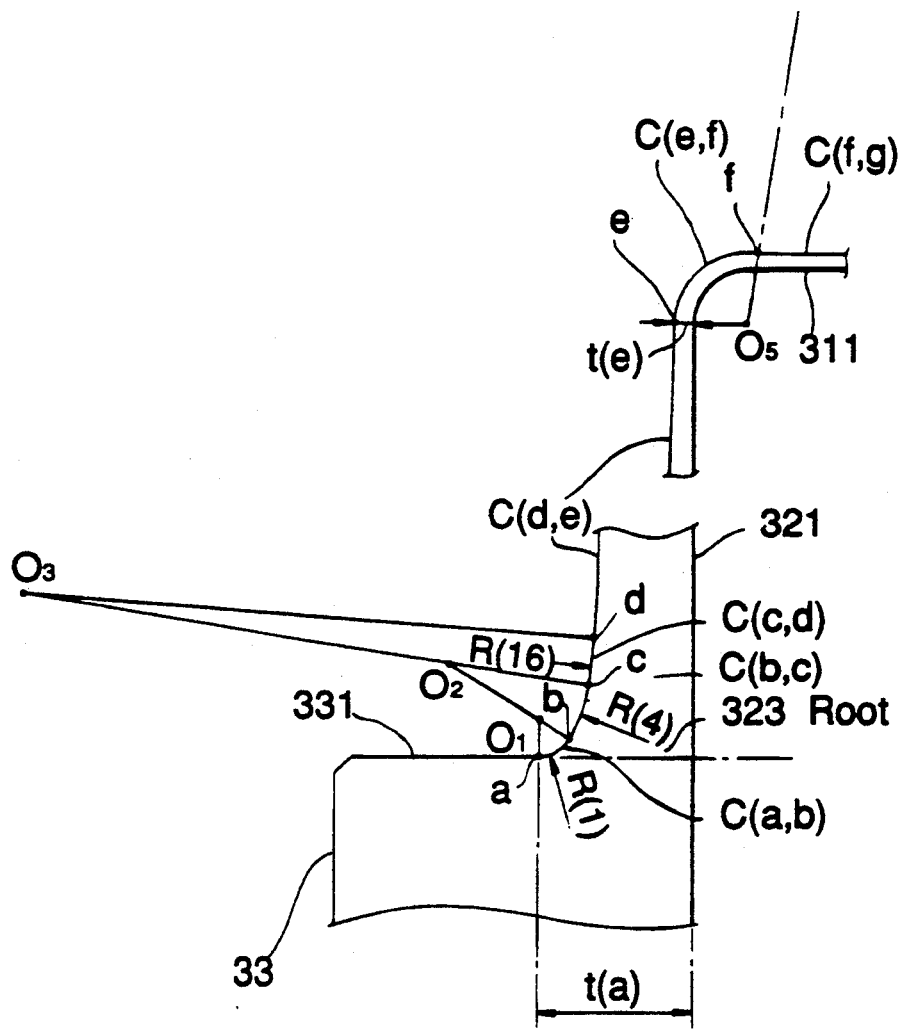
FIG. 4 is a partial sectional view of the flexspline of FIG. 3 in an enlarged scale.

FIG. 3 illustrates a longitudinal section of the cup-shaped flexspline 3. An axial length 5 of the flexspline 3 is defined as the distance from an inner surface 321 axially to the end of the teeth 34. A pitch diameter D of the flexspline, which is the diameter of a pitch circle of the flexspline, is also shown. FIG. 4 illustrates mainly an encircled portion in FIG. 3 in an enlarged scale. The diaphragm 32 of the flexspline 3 has an inner surface 321 which is defined by a plane substantially perpendicular to the axis 11 of the gear drive 1. The outer surface 322 of the diaphragm 32 is defined by a plurality of curves having a different curvature so as to have a thickness gradually reducing radially and outwardly. The diaphragm and tube portions 32, 31 are connected integrally by a portion which outer surface is defined by an arc C(e,f) having a center 05 and a radius R(7.25) to have a constant thickness t(e,f). The starting point e of the arc C(e,f) is an intersection of a line passing through the center 05 and parallel to the axis 11 with the outer surface 322 of the diaphragm 32, while the end point f thereof will be explained later.

The tube 31 continued from the arc C(e,f) has an inner surface 311 defined by a straight line parallel to the axis 11. The outer surface of the tube portion 31 adjacent to the arc C(e,f) is defined by an arc C(f,g) continued from the arch C(e,f). The arch C(f,g) has a center 06 located outside the flexspline and a large radius R(250). The boundary point f between the arcs C(e,f) and C(f,g) is set to be positioned where these two arches form a smooth curve. The other portions of the outer surface of the tube portion 31 is defined by a straight line L(g,h) parallel to the axis 11 and continued from the arc C(f,g), thus having a constant thickness t(g,h). In this embodiment, the portion of the tube 31 defined by the arc C(f,g) has a thickness t(f,g) less than those of the other portions. The ratio of the minimum thickness t(f,g) and the thickness t(g,h) of the other portion of the tube 31 is set about 0.8:1.

Next, the profile of the outer surface of the diaphragm 32 will be explained in detail. As illustrated in FIG. 4, the outline 331 of the boss 33 is parallel to the axis 11, an extension of which defines the root 323 of the diaphragm 32 from the boss 33. Continued from the outline 331, an arc C(a,b) having a center 01 and a unit radius R(1) begins from point a to form an outer surface 322 of the diaphragm 32. The arc C(a,b) is connected to an arch C(b,c) having a center 02 and a larger radius R(4), which in turn is connected to an arc C(c,d) having a center 03 and a more larger radius R(16). Further, continued from the arc C(c,d), an arch C(d,e) having a center 04 and a still more larger radius R(600)(see FIG. 3). This arc C(d,e) is connected to the arch C(e,f) at point e.

As explained above, the four arches having a different radius are utilized to define the profile of the outer surface 322 of the diaphragm 32, whereby the diaphragm 32 has a thickness gradually reducing from the root portion 323 to the outward side in the radial direction. In the present embodiment, the profile of the diaphragm tapers from a maximum thickness t(a) at the root portion 32 to the minimum thickness at point e by a ratio of about 4 to 1.

In the above description, each number in the parenthesis attached to the radius R represents a ratio with reference to the unit radius R(1) of the arch C(a,b).

In operation of the harmonic reduction gear drive 1 of the present embodiment, the cup-shaped flexspline 3 is repeatedly deformed in the radial direction by the wave generator 4 and the bending stress is appeared in each portion thereof according to the amount of deformation. Since the root portion 323 of the diaphragm 32 from the boss 33 has a thickness t(a) approximately four times as the minimum thickness t(e) of the diaphragm 32, excessive stress concentration in the root portion can be avoided. According to experiments conducted by the inventors of the present invention, it has been found that, as long as the thickness of the root porton is maintained at least about three times as the minimum thickness of the diaphragm, stress concentration in the root portion can be modified for practical use even where the axial length of the flexspline 3 is reduced to a certain extent.

In addition, the outer surface of the diaphragm 32 is defined by a plurality of curves having a different curvature arranged so that the curvatures of the curves are gradually reduced from the inner to the outer sides in the radial direction. With this, the stress distribution along the overall of the diaphragm 32 can be made smoothly without stress concentration as a synergistic effect of the thickness of the root portion being approximately four times as the minimum thickness.

Furthermore, the diaphragm 32 is formed with the thin portion adjacent to the tube 31 by the arc C(f,g). Since the stress appeared in this portion is relatively small, the smooth stress distribution can be obtained in and around this portion.

Figure 5:
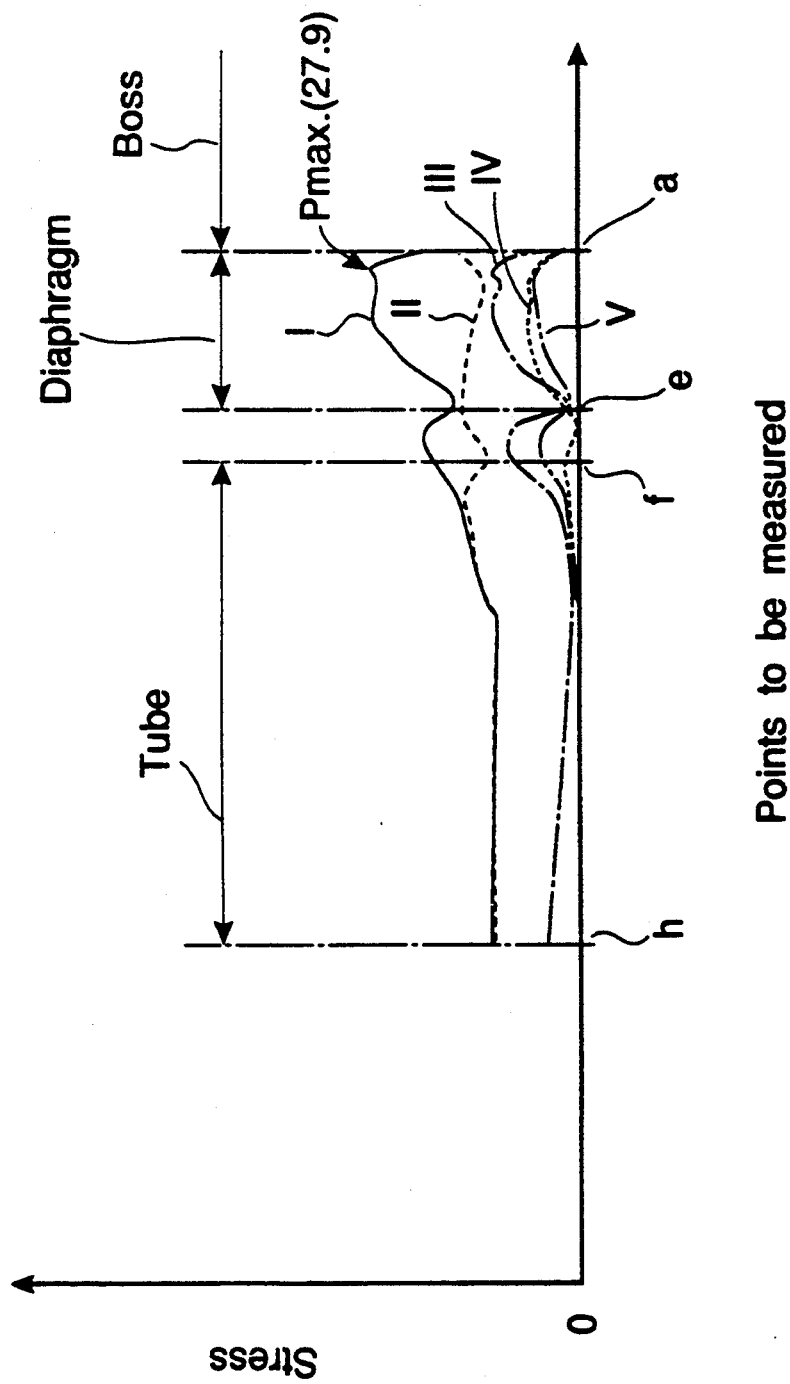
FIGS. 5 to 8 are graphs of stress distrbusion curves of flexsplines, respectively.
Figures 19A, 19B:
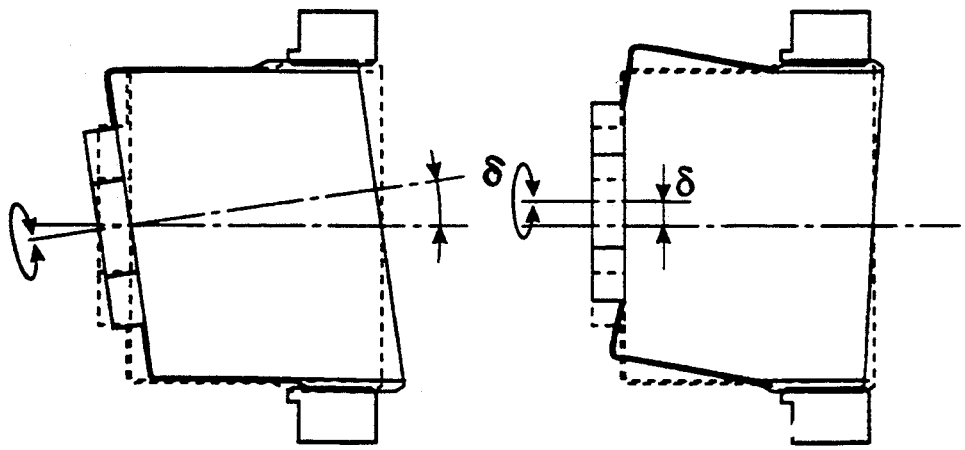
FIGS. 19(A) and 19(B) show misalignment of a flexspline setting, respectively; and, FIGS. 20(A) and 20(B) show conventional diaphragm shapes of a flexspline.

FIG. 5 shows a graph of stress distribution curves of the cup-shaped flexspline 3 according to the present embodiment, in which a curve II represents the stress distribution occurred by torque transfer, a curve III represents that by inclination of the flexspline setting (see FIG. 19(A)), a curve IV represents that by coning of the flexspline, and a curve V represents that by deviation of the flexspline setting (see FIG. 19(B)). A curve I represents the resultant stress distribution obtained by synthesizing the respective stresses of the curves II to V. The curves I to V represent the same stress distributions of FIGS. 6 to 8 as those in FIG. 5, respectively. In the curve I of FIG. 5, the peak stress of 27.9 points appears on a portion adjacent to the root portion 323 of the diaphragm 32.

Figure 6:
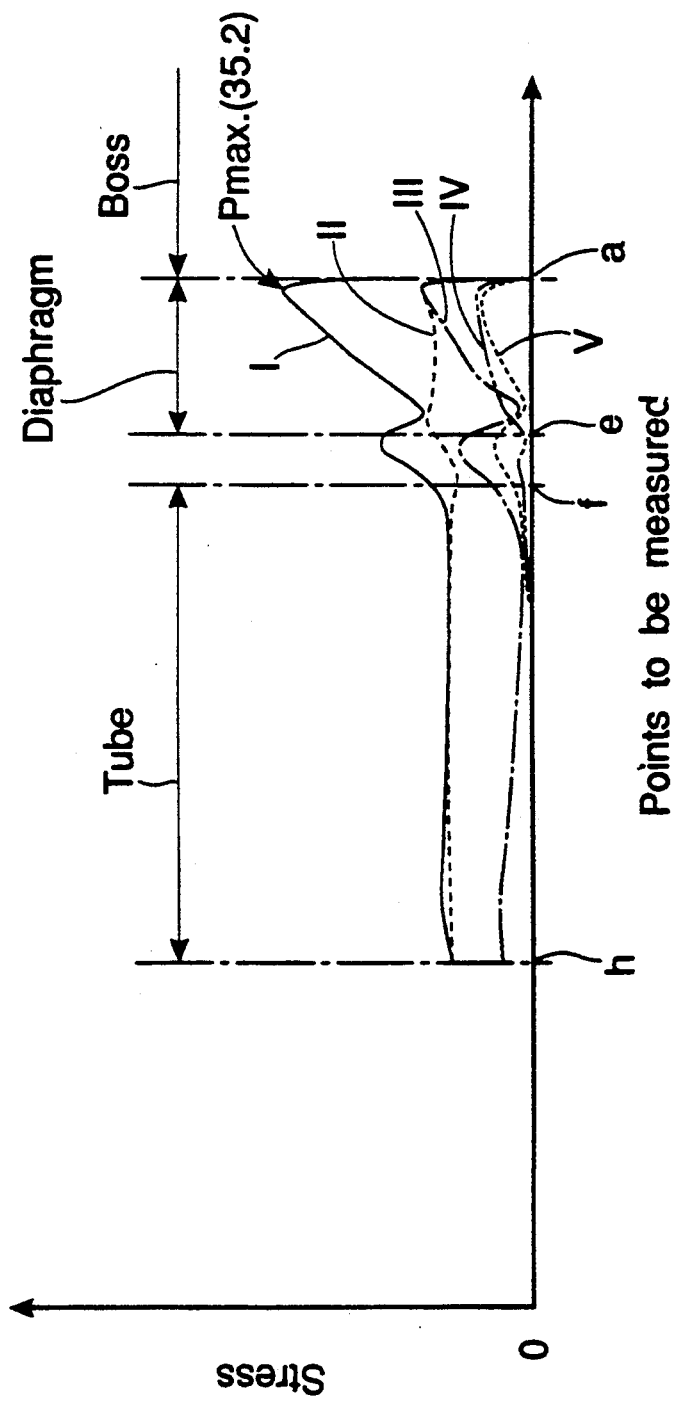
Figures 20A, 20B:
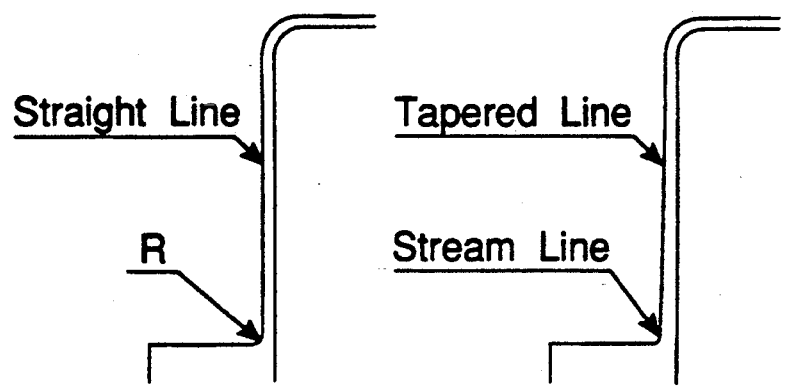

FIG. 6 shows a graph of stress distribution curves I to V obtained from a flexspline of FIG. 20(B) which is formed such that it has a thickness gradually reduced from the boss to the diaphragm along a streamline and that it has the diaphragm tapered radially and outwardly so as to reduce a thickness gradually radially and outwardly. In this case, the synthesized peak stress of 35.2 points was measured as seen from the curve I.

Figure 7:
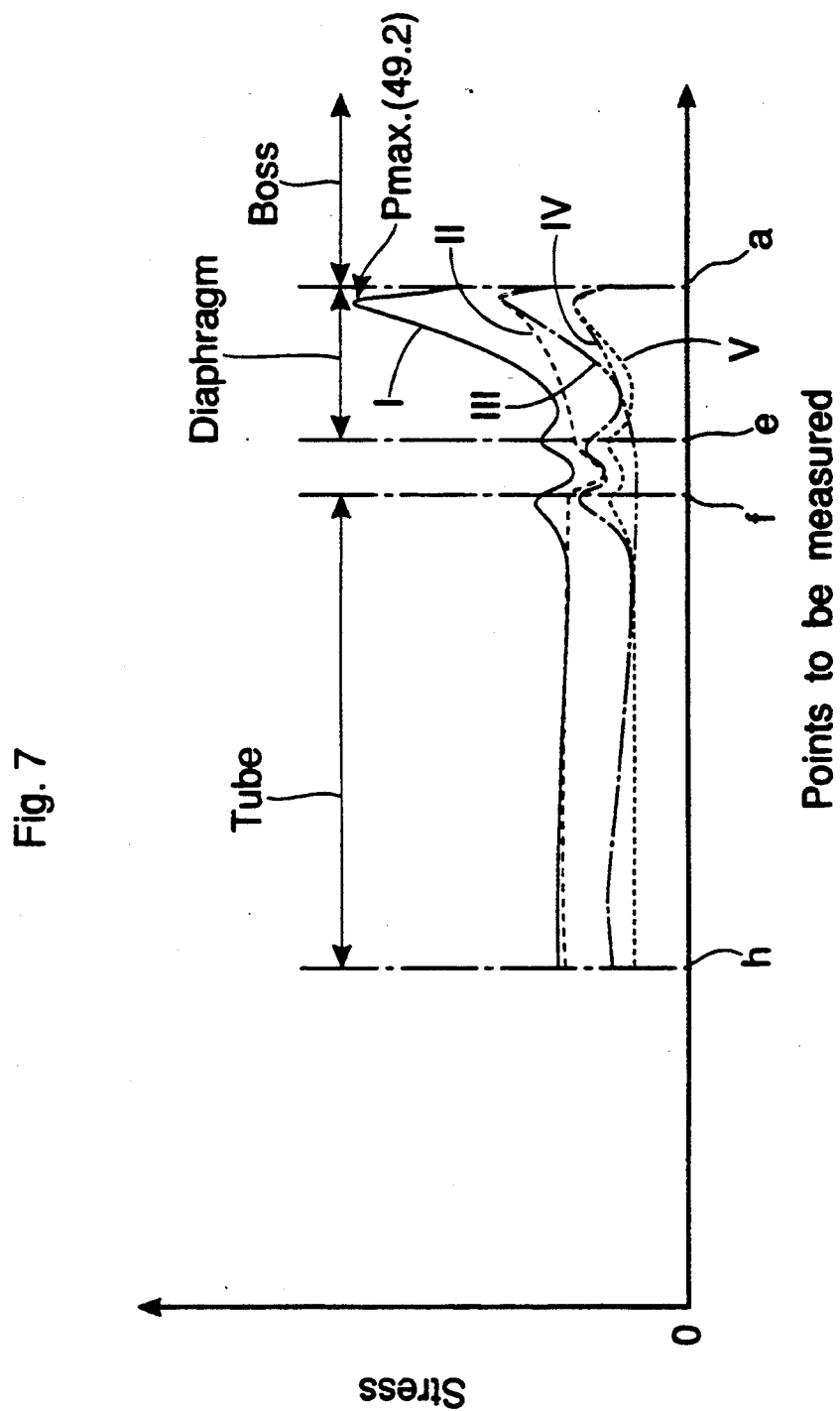

On the other hand, FIG. 7 shows a graph of stress distribution curves I to V of a flexspline of FIG. 20(A). The flexspline is formed to have the diaphragm of the same thickness. In this case, the synthesized peak stress of 49.7 points were measured.

Figure 8:
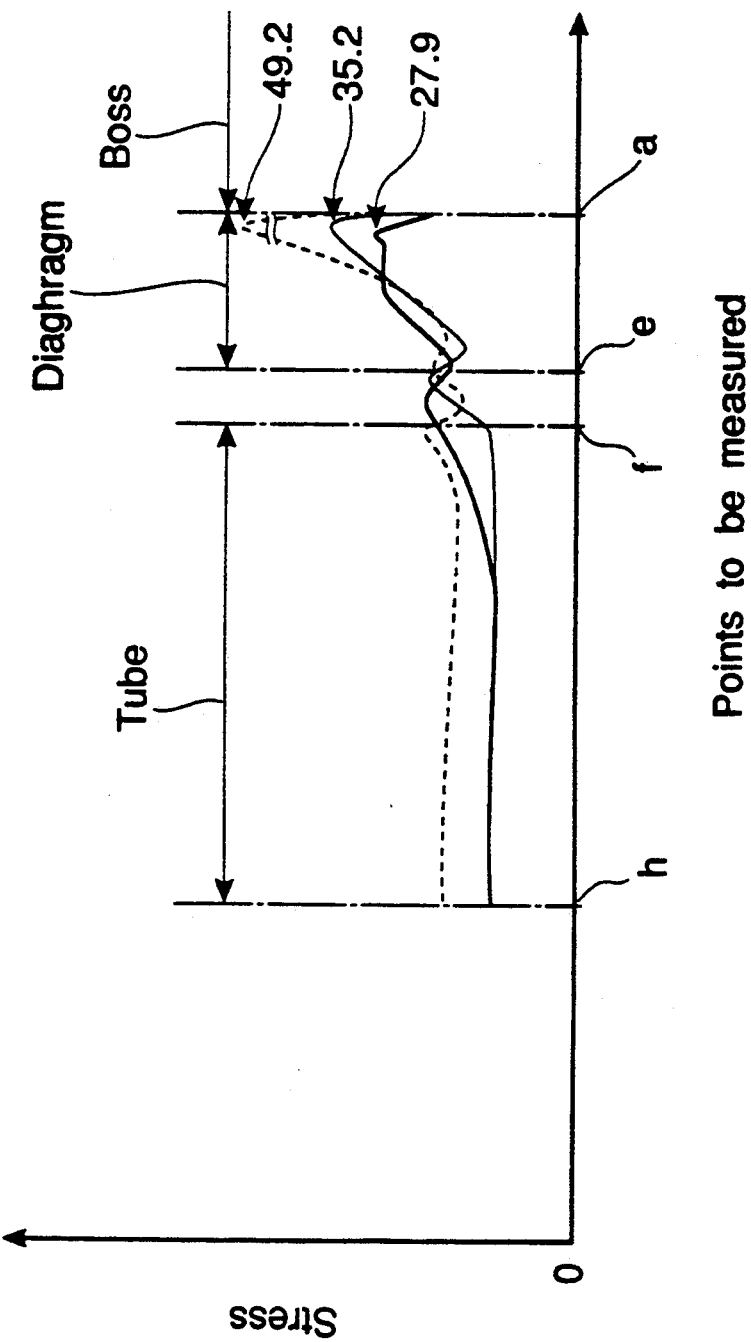

FIG. 8 shows these three curves I for comparison with one another. As is apparent from the drawing, the peak stress occurred on the root portion of the diaphragm of the flexspline according to the present embodiment was greatly reduced in comparison with those of the other conventional flexsplines. Further, it is found that the smooth stress distribution was obtained from the flexspline according to the present invention. Particularly, the stress distribution from the tube to the diaphragm of the flexspline of the present embodiment becomes smooth compared to those of the other two flexsplines. This is considered to be the effect obtained by the thin portion formed on the tube.

As mentioned above, the smooth stress distribution can be obtained from the flexspline of the present embodiment without undesirable stress concentration. Therefore, it can be avoided that the flexspline suffers from mechanical fatigue partially due to stress concentration, so that the lifetime thereof can be prolonged. Further, even where the axial length of the flexspline is reduced, excessive stress concentration on the flexspline can be suppressed. Thus, according to the present embodiment, a shorter flexspline can easily be applied for practical use.

Although a plurality of arc having a different curvature are utilized to define the outerline of the diaphragm in the present embodiment, the other curves may be utilized for the outline of the diaphragm as long as curves of a different curvature are arranged from one having a larger curvature from the root portion of the diaphragm so that the diaphragm has a thickness gradually reduced radially and outwardly. In addition, curves having curvatures which are different from those of the present embodiment can be adopted. The thickness of the thin portion formed on the tube can also be varied.

The inventors of the present invention et. al. found that curvatures of the curves defining the outline of the diaphragm 32 and a thickness thereof are preferably set to be as follows with respect to the pitch diameter D of the flexspline 3.

Figure 9:
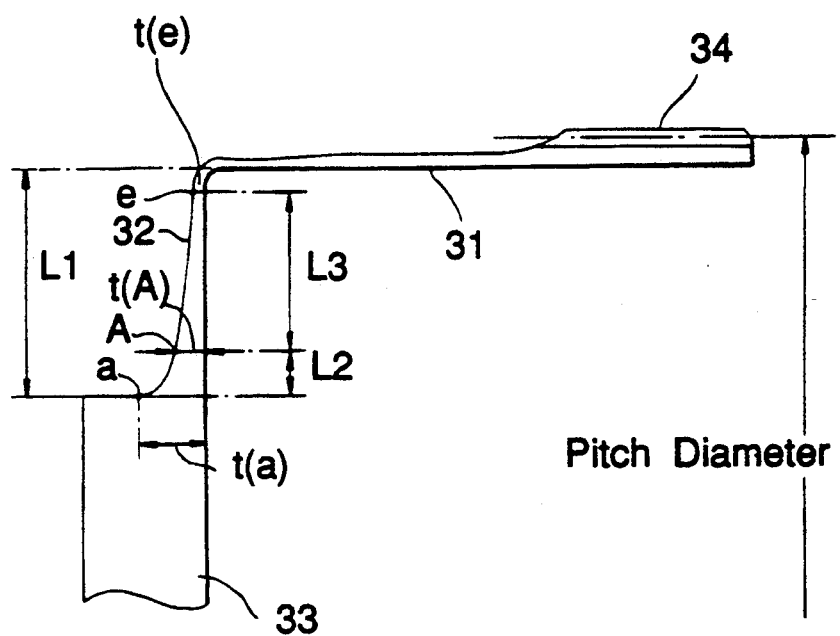
FIG. 9 is a partial sectional view of a flexspline.
Figure 10:
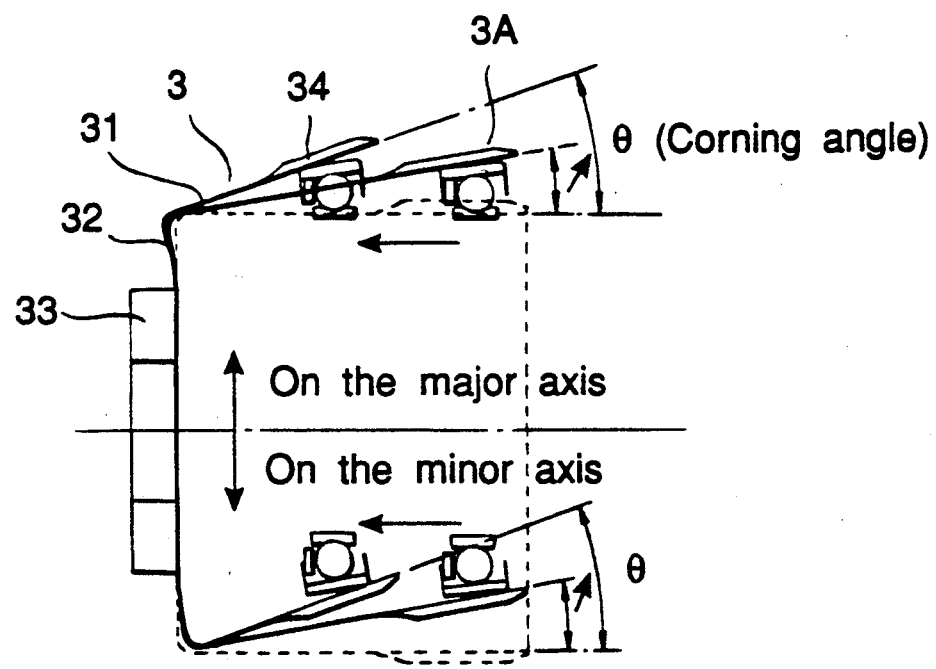
FIG. 10 shows the coning angle of a flexspline.
Figure 11:
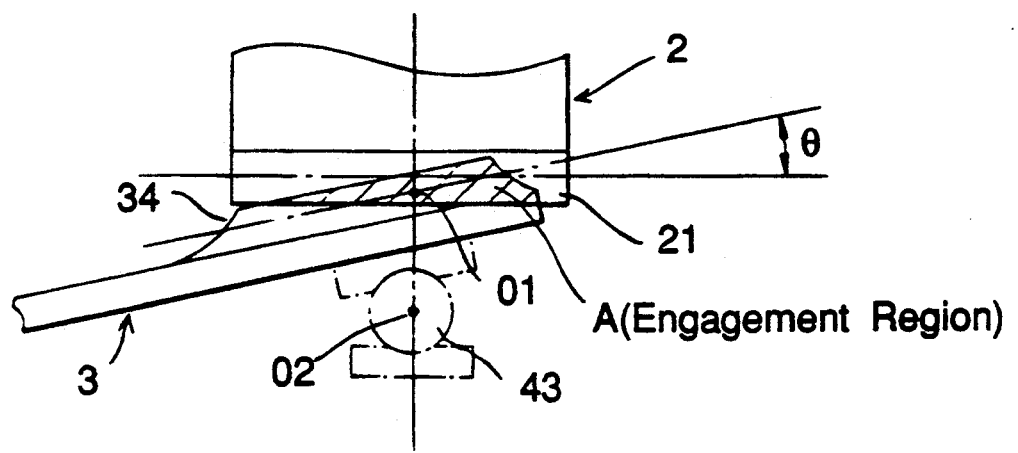
FIG. 11 shows the engagement region of the flexspline and the circular spline of a harmonic gear drive where the coning angle of the flexspline is small.
Figure 12:
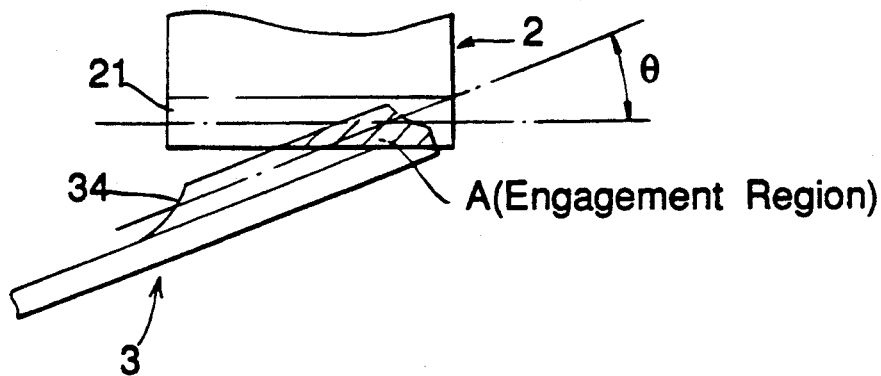
FIG. 12 shows the engagement region of the flexspline and the circular spline of a harmonic gear drive where the coning angle of the flexspline is large.

Referring to FIG. 9, there will be described as to the curvatures of the curves defining the outline of the diaphragam 32. In the drawing, L1 represents the length from the root a of the diaphragm 32 to the radially outer end thereof. The curvature radius of each of the curves used is preferable in the range as follows.
(1) Region L2 from the root a to point A:
Curvature radius $\geq 0.0015$ D
where $0 \leq L2 \leq 0.15$ D
(2) Region L3 from points A to e:
Curvature radius $\geq 0.05$ D Next, a thickness of each of points a, A and e is set to be as follows:
$0.01$ D$\leq t(a) \leq 0.025$ D
$0.4 \leq t(A)/t(a) \leq 0.7$
$t(e)/t(a) \leq \frac{1}{3}$ According to the present embodiment, it is found that a flexspline formed to have a ratio of pitch diameter thereof and the length thereof being in the range of 1:0.7 to 1:0.2 can be used for practical use.

Figure 13:
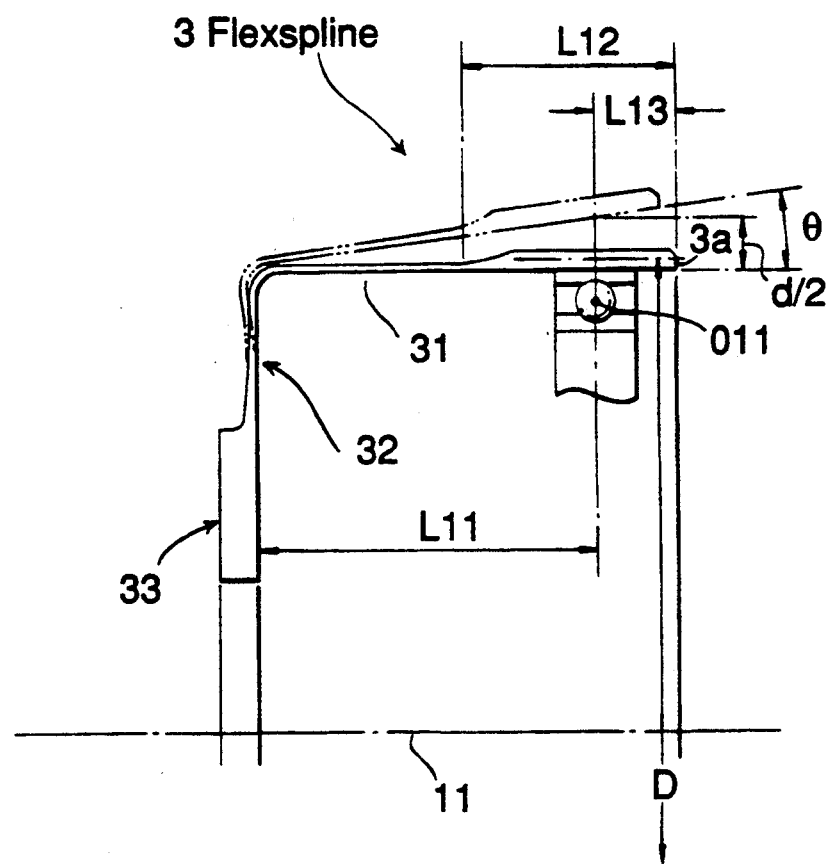
FIG. 13 is a partial sectional view of a flexspline.

Referring now to FIG. 13, another embodiment of the present invention will be described, in which the position of a wave bearing is adjusted in order to realize proper engagement between the circular spline and the flexspline in the case where a shorter flexspline is employed. The harmonic reduction gear drive of FIG. 13 has the same structure as that of the previous embodiment except for the location of the wave bearing thereof.

In FIG. 13, L11 is a distance from the bottom of the cup-shaped flexspline 3 to the center 011 of the wave bearing, d is a deformation in the radial direction of the flexspline 3 at the center 011 of the wave bearing, D is a pitch diameter of the flexspline 3, $\Theta$ is a coning angle of the flexspline 3, and L12 is a tooth width of the flexspline 3. L13 represents a distance from the bearing center 011 to the open end 3a of the flexspline 3. According to the present embodiment, L13 is set in the range defined by the following expressions (a) and (b):

$$3 D \cdot \tan \Theta \leq L13 \leq 10 D \cdot \tan \Theta \quad (a)$$

$$L13 \leq D/10 \quad (b)$$

The value of tan $\Theta$ can be approximated by expression (c).

$$\tan \Theta \approx d/21 \quad (c)$$

Thus, where $(d/21) \cdot D$ is replaced by x, expression (a) can be approximated by expression (d).

$$3x \leq L13 \leq 10x \quad (d)$$

The coning angle $\Theta$ depends generally on a speed ratio of the reduction gear drive. Where the speed ratio is small to be about 1/50, the value of L13 is set near 3x. Where the speed ratio is large to be about 1/160, the value of L13 is set near 10x.

It is preferable that, in order to avoid interference between the circular spline and the flexspline, the upper limit of the tooth length L12 of the flexspline is defined by expression (e).

$$L12 \leq 0.24 D$$

According to the present embodiment, the bearing center 011 can be located on or near the center of the engagement region of the circular spline and the flexspline irrespective of the degree of the coning angle of the flexspline. Therefore, proper engagement between the circular spline and the flexspline can be maintained by the wave bearing.

Figure 14:
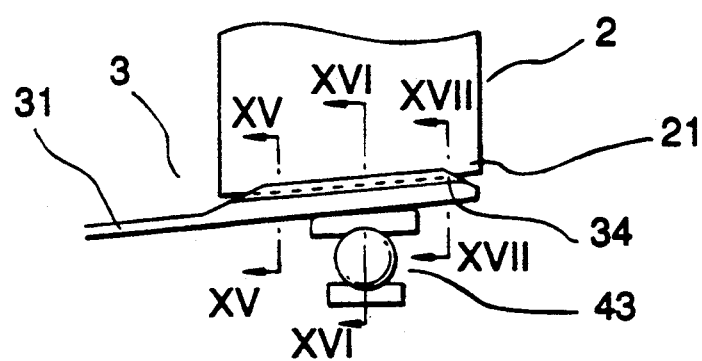
FIG. 14 shows engagement of a flexspline and a circular spline.
Figure 15:
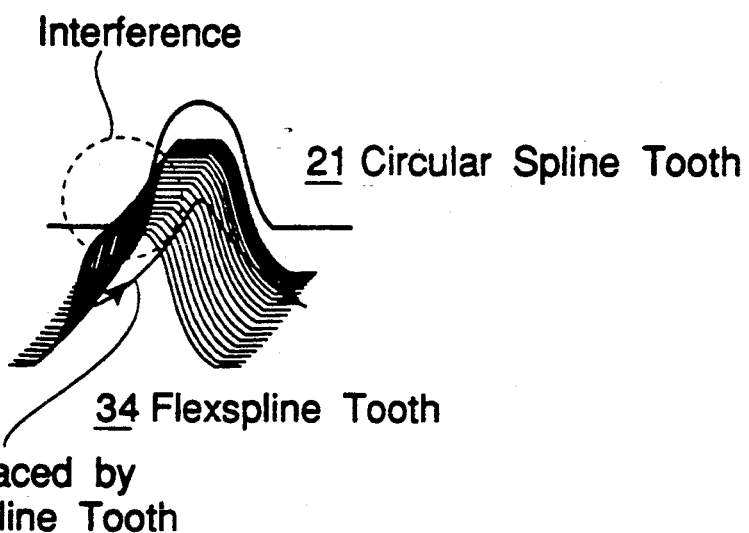
FIGS. 15 to 17 are graphs showing tooth engagement conditions of a flexspline and a circular spline, respectively.
Figure 16:
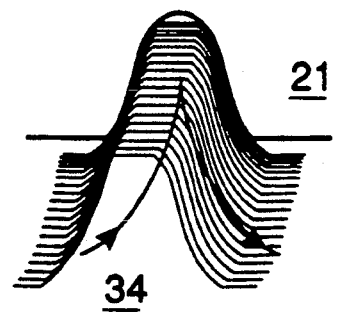
Figure 17:
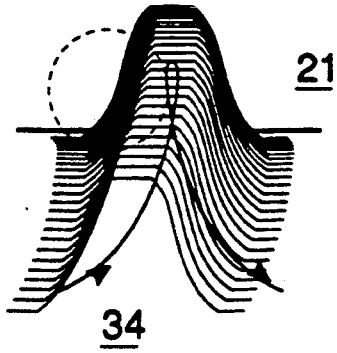

With reference to FIGS. 14 to 17, more consideration made to the engaging condition between the circular spline and the flexspline. As the length of the flexspline 3 is reduced, the coning angle thereof increases. The increase of the coning angle causes an increase in the movement locus of the flexspline tooth along the tooth width. That is, although proper engagement is obtained at the center portion where the flexspline 3 is supported by the wave bearing 43 as shown in FIG. 14, insufficient engagement occurs between the splines at the tube side as shown in FIG. 15, whereas excessive engagement occurs at the open end side as shown in FIG. 17. In either engagement of FIGS. 15, 17, it is observed an interference between the splines at the encircled portions of FIGS. 15, 17.

Figure 18:
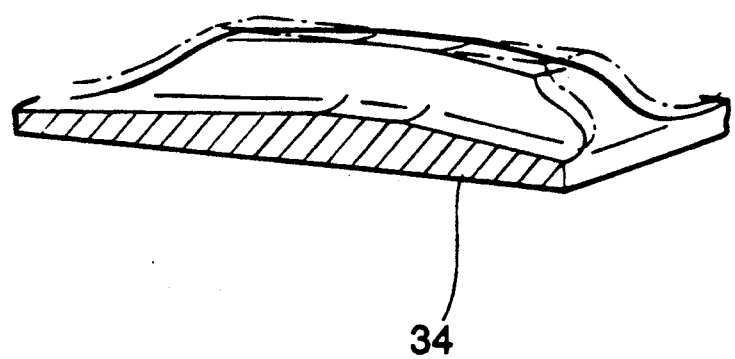
FIG. 18 shows an example of a tooth shape applied with relieving.

In order to avoid such interference, it is preferable that the tooth width of the flexspline 3 is reduced with respect to the axial length of the flexspline 3. In addition, it is preferable to relieve the flexspline tooth as shown in FIG. 18. By adjusting the relieving applied to the flexspline tooth, proper engagement between the splines can be realized overall of the tooth width.

We claim:

1. A cup-type harmonic drive comprising a circular rigid member, a cup-shaped flexible member disposed inside the circular rigid member and a wave generator means fitted inside the flexible member for flexing the flexible member radially to engage or contact it with portions of the circular rigid member and for rotating engagement or contact portions to produce relative rotation between the circular rigid member and the flexible member, wherein said cup-shaped flexible member has a tube, a disc-shaped diaphragm connected integrally to an end of said tube to define a cup bottom, and a boss formed on a center portion of said diaphragm, said diaphragm having a root portion extending from said boss, a thickness of which is at least about three times a minimum thickness of said diaphragm.

2. A cup-type harmonic drive in accordance with claim 1, wherein an outer profile of said diaphragm is defined, when viewed along a plane including the axis of said flexible member, by a plurality of curves having a different radius of curvature, said curves being arranged to form a continuous curved surface from one having a smaller radius of curvature at said root portion to a larger radius of curvature at said tube portion of the diaphragm, wherein the thickness of the diaphragm is set to reduce continuously from a maximum near the center portion to a minimum at the outer sides.

3. A cup-type harmonic drive in accordance with claim 2, wherein said tube of said flexible member has a wall portion extending from said diaphragm to a toothed portion of the tube, the wall portion having a thickness adjacent to the diaphragm which is less than that of the wall portion adjacent to the toothed portion.

4. A cup-type harmonic gear drive comprising a circular spline, a cup-shaped flexspline disposed inside said circular spline and a wave generator means fitted inside said flexspline for flexing the flexspline radially to engage it with the circular spline partially and for rotating engagement portions to produce relative rotation between said circular spline and said flexspline, wherein said cup-shaped flexspline has a tube, a disc-shaped diaphragm connected integrally to an end of said tube to define the cup bottom, and a boss formed on a center portion of said diaphragm, said diaphragm having a root portion extending from said boss, said root portion having a thickness which is at least about three times a minimum thickness of said diaphragm.

5. A cup-type harmonic gear drive in accordance with claim 4, wherein an outer profile of said diaphragm, when viewed along a plane including the axis of said flexspline, has a radius of curvature, said radius of curvature varying from a minimum at said root portion to a maximum near said tube portion of the diaphragm, wherein a thickness of the diaphragm is set to reduce continuously from a maximum near the center portion to a minimum at the outer sides along the radial direction.

6. A cup-type harmonic gear drive in accordance with claim 5, wherein said tube of said flexspline has a wall portion extending from said diaphragm to a toothed portion of the tube, the wall portion having a thickness adjacent to the diaphragm which is less than that of the wall portion adjacent to the toothed portion.

7. A cup-type harmonic gear drive in accordance with claim 6, wherein said flexspline is formed so that the ratio of a pitch diameter thereof to an axial length thereof is in the range of about 1:0.7 to 1:0.2.

8. A cup-type harmonic gear drive in accordance with claim 7, wherein the tooth face of each of the splines has a shape defined by mapping curve which is a similarity transformation having a reduced scale of $\frac{1}{2}$ applied to a movement locus of the flexspline to the circular spline in accordance with the configuration of the wave generator, said transformation being effected on a reference point where the splines are transferred from a condition of contact with each other to a condition of disengagement from each other.

9. A cup-type harmonic gear drive in accordance with claim 8, wherein said wave generator means is positioned with respect to said flexspline so that a center of a supporting surface of said wave generator means for said flexspline is substantially in accordance with the center of the engagement region between said flexspline and said circular spline viewed along the tooth length direction.

10. A cup-type harmonic gear drive in accordance with claim 9, wherein said center of the supporting surface of said wave generator means is positioned within a region $L12/2$ measured from the open end of said flexspline along the tooth length where $L12$ is a tooth length of said flexspline.

11. A cup-type harmonic gear drive in accordance with claim 10, wherein said center of a supporting surface of said wave generator means is positioned so that a distance $L13$ from an open end of said flexspline to said center of the supporting surface is in the range of about $3 D \tan \Theta$ to $10 D \tan \Theta$ where $\Theta$ is the coning angle of said flexspline occurred by deforming said flexspline with said wave generator means and $D$ is the pitch diameter of said flexspline.

12. A cup-type harmonic gear drive in accordance with claim 11, wherein said distance $L13$ is equal to or less than about $D/10$.

13. A cup-type harmonic gear drive in accordance with claim 12, wherein the tooth length of said flexspline is equal to or less than 14. A cup-type harmonic gear drive in accordance with claim 13, wherein the flexspline is deformed into an elliptic configuration to bring the teeth of the flexspline into engagement with those of the circular spline at two points on the major axis of an ellipsoid.

15. A cup-type harmonic gear drive comprising a circular spline, a cup-shaped flexspline disposed inside said circular spline and a wave generator means fitted inside said flexspline for flexing the flexspline radially to engage it with portions of the circular spline and for rotating engagement portions to produce relative rotation between said circular spline and said flexspline, wherein said wave generator means is positioned with respect to said flexspline so that a center of a supporting surface of said wave generator means is positioned so that a distance $L13$ from an open end of said flexspline to said center of the supporting surface is in the range of about $3 D \cdot \tan \Theta$ to $10 \cdot D \tan \Theta$ where $\Theta$ is the coning angle of said flexspline occurred by deforming said flexspline with said wave generator means and $D$ is the pitch diameter of said flexspline.

16. A cup-type harmonic gear drive in accordance with claim 15, wherein said distance $L13$ is equal to or less than about $D/10$.

17. A cup-type harmonic gear drive in accordance with claim 16, wherein the tooth length of said flexspline is equal to or less than 0.24 D.

18. A cup-type harmonic gear drive comprising a circular spline, a cup-shaped flexspline disposed inside said circular spline and a wave generator means fitted inside said flexspline for flexing the flexspline radially to engage it with the circular spline partially and for rotating the engagement portions to thereby produce relative rotation between said circular spline and said flexspline, wherein
said flexspline is formed so that the ratio of the pitch diameter thereof to the axial length thereof is in the range of about 1:0.7 to 1:0.2.

19. A cup-type harmonic gear drive in accordance with claim 18, wherein the tooth face of each of the splines has a shape defined by mapping curve which is a similarity transformation having a reduced scale of $\frac{1}{2}$ applied to a movement locus of the flexspline to the circular spline in accordance with the configuration of the wave generator, said transformation being effected on a reference point where the splines are transferred from a condition of contact with each other to a condition of disengagement from each other.

20. A cup-type harmonic gear drive in accordance with claim 19, wherein said cup-shaped flexspline has a tube, a disc-shaped diaphragm connected integrally to an end of said tube to define a cup bottom, and a boss formed on a center portion of said diaphragm, said diaphragm having a root portion extending from said boss, said root portion having a thickness which is at least about three times a minimum thickness of said diaphragm.

21. A cup-type harmonic gear drive in accordance with claim 20, wherein an outer profile of said diaphragm, when viewed along a plane including the axis of said flexspline, has a varying radius of curvature, said outer profile being arranged to form a continuous curved surface from having a minimum radius of curvature from said root portion to a maximum radius of curvature near said tube portion, wherein the thickness of the diaphragm is set to reduce continuously from a maximum near the center portion to a minimum at the outer sides in the radial direction.

22. A cup-type harmonic gear drive in accordance with claim 18, wherein said cup-shaped flexspline has a tube, a disc-shaped diaphragm connected integrally to an end of said tube to define a cup bottom, and a boss formed on a center portion of said diaphragm, said diaphragm having a root portion extending from said boss, said root portion having a thickness which is at least about three times a minimum thickness of said diaphragm.

23. A cup-type harmonic gear drive in accordance with claim 22, wherein the outer profile of said diaphragm is defined, when viewed along a plane including the axis of said flexspline, by a plurality of curves having a different curvature, said curves being arranged to form a continuous curved surface from one having a larger curvature from said root portion to said tube portion of the diaphragm, wherein the thickness of the diaphragm is set to reduce continuously from a maximum near the center portion to a minimum at the outer sides.

24. A cup-type harmonic gear drive in accordance with claim 18, wherein said wave generator means is positioned with respect to said flexspline so that the center of the supporting surface of said wave generator means for said flexspline is substantially in accordance with the center of the engagement region between said flexspline and said circular spline viewed along the tooth length direction.

25. A cup-type harmonic gear drive in accordance with claim 24, wherein said center of the supporting surface of said wave generator means is positioned within a region L12/2 measured from the open end of said flexspline along the tooth length where L12 is a tooth length of said flexspline.

26. A cup-type harmonic gear drive in accordance with claim 25, wherein said center of the supporting surface of said wave generator means is positioned so that a distance L13 from the open end of said flexspline to said center of the supporting surface is in the range of about 3 D·tan $\Theta$ to 10·D tan $\Theta$ where $\Theta$ is the coning angle of said flexspline occurred by deforming said flexspline with said wave generator means and D is the pitch diameter of said flexspline.

27. A cup-type harmonic gear drive in accordance with claim 26, wherein said distance L13 is equal to or less than about D/10.

28. A cup-type harmonic gear drive in accordance with claim 27, wherein the tooth length of said flexspline is equal to or less than 0.24 D.

* * * * *

US005269202C1

(12) EX PARTE REEXAMINATION CERTIFICATE (4933rd)
United States Patent
Kiyosawa et al.

(10) Number: US 5,269,202 C1
(45) Certificate Issued: May 4, 2004

(54) CUP-TYPE HARMONIC DRIVE HAVING A SHORT, FLEXIBLE CUP MEMBER

(75) Inventors: Yoshihide Kiyosawa, Nagano (JP); Noboru Takizawa, Nagano (JP); Takahiro Oukura, Nagano (JP); Yoshito Yamamoto, Nagano (JP)

(73) Assignee: Harmonic Drive Systems, Inc., Kawasaki (JP)

Reexamination Request:
No. 90/006,166, Dec. 27, 2001

Reexamination Certificate for:
Patent No.: 5,269,202
Issued: Dec. 14, 1993
Appl. No.: 07/885,780
Filed: May 20, 1992

(30) Foreign Application Priority Data

May 20, 1991 (JP) ............................ 3-035507 U

(51) Int. Cl.[7] ................................................ F16H 1/32
(52) U.S. Cl. ........................................................ 74/640
(58) Field of Search ............................................ 74/640

(56) References Cited

FOREIGN PATENT DOCUMENTS

JP          61-173851         10/1986

OTHER PUBLICATIONS

"Mechanical Engineering", Jul. 1964, *Design the "Flexspline" With Plastics*, by David V. Tinder and William R. Carey, pp. 50–53.

*Primary Examiner*—Dirk Wright

(57) ABSTRACT

A cup-type harmonic gear drive comprises a rigid circular spline, a cup-shaped flexspline disposed inside the circular spline and a wave generator means fitted inside the flexspline for flexing the flexspline into elliptic to engage it with the circular spline and for rotating the engagement portions to thereby produce relative rotation between the splines. The flexspline has a tube, a disc-shaped diaphragm connected integrally to the end of said tube to define the cup bottom, and a thick boss formed on the center of the diaphragm. The diaphragm has a root portion from the boss, a thickness of which is set at least about three times the minimum thickness of the diaphragm. The outer profile of the diaphragm is defined, when viewed along a plane including the axis of the flexspline, by a plurality of curves having a different curvature. These curves are arranged from one having a larger curvature from the root protion to the tube portion of the diaphragm. Thus, the stress distribution of the flexspline can be made smooth to the extent for practical use even where a shorter flexspline is adopted.

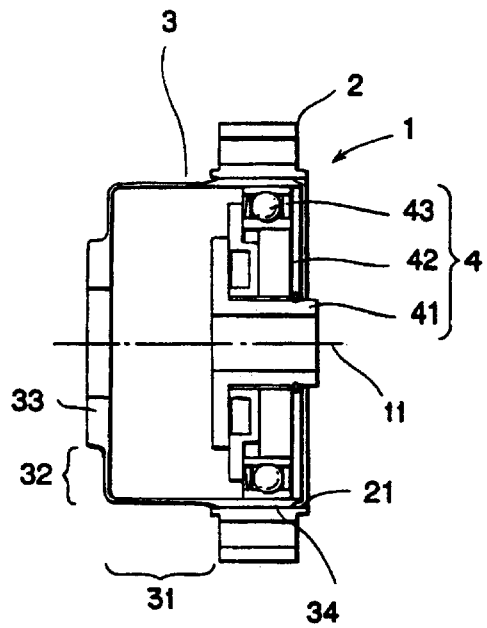

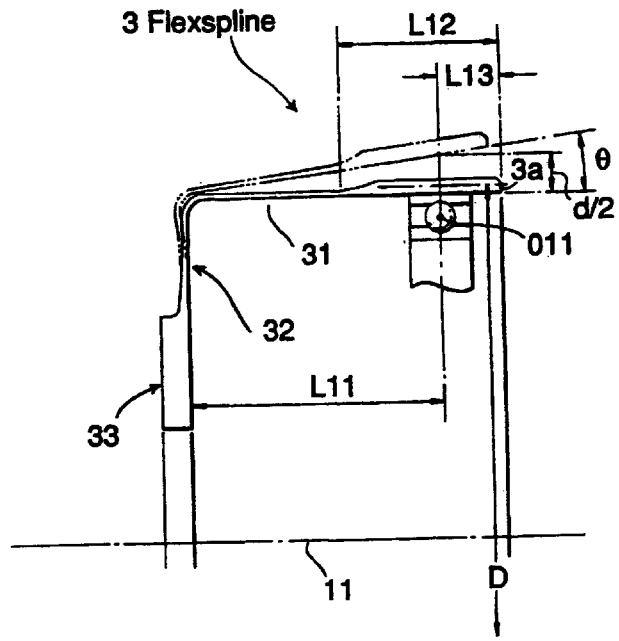

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–28 is confirmed.

\* \* \* \* \*